United States Patent Office 3,127,361
Patented Mar. 31, 1964

3,127,361
PROCESS FOR PRODUCING POLYMERS OF TRI-O-p-TOLYLSULFONYL-SUCROSE AND POLYMERS OF TETRA - O - p - TOLYLSULFONYL - SUCROSE, AND RESULTING POLYMERS
Louis Long, Jr., Concord, and Erik Vis, Cochituate, Mass., assignors to the United States of America as represented by the Secretary of the Army
No Drawing. Filed Nov. 21, 1960, Ser. No. 70,895
15 Claims. (Cl. 260—9)

This invention concerns tolylsulfonyl-sucrose containing compositions and processes for making them. These compositions are useful as adhesives, cellular plastics, and for other purposes hereafter stated.

It has heretofore been proposed in Patent No. 2,365,776, Albert L. Raymond et al., dated December 26, 1944, to react sucrose and p-tolylsulfonyl chloride, whereby to substitute three of the eight hydroxyl groups of the sucrose molecule by p-tolylsulfonyl radicals. We have found by chromatographic analysis that compounds obtained in accordance with the teaching of this patent are not chemically pure but are a mixture principally consisting of tetra-O-p-tolylsulfonyl-sucrose and small amounts of sucrose with varying degrees of tolyl-sulfonylation.

In the course of our research we have succeeded in the production of chemically pure tri-O-p-tolylsulfonyl sucrose and tetra-O-p-tolylsulfonyl-sucrose, and have proved them to be such by chromatographic analysis. We have further made the unexpected discovery that tetra-O-p-tolylsulfonyl-sucrose is useful as a strong adhesive for glass and other difficult-to-laminate substances, if the tetra-O-p-tolylsulfonyl-sucrose is plasticized with a commercially available plasticizer such as sucrose acetate isobutyrate.

Finally our research has resulted in the valuable and surprising discovery that tri-O-p-tolylsulfonyl sucrose and tetra-O-p-tolylsulfonyl-sucrose (particularly the latter) form a series of condensation polymers with bifunctional organic compounds, such as aromatic dithiols, alkylene diamines, aromatic diamines and aromatic diisocyanates. A majority of these polymers can be plasticized to yield coating and adhesive compositions; others, particularly the urethane-type-condensation products of tetra-O-p-tolylsulfonyl-sucrose and an aromatic diisocyanate also yield solid and cellular polymers, useful for insulation purposes and as structural materials.

In the following description of our invention we will first set forth syntheses of chemically pure tri-O-p-tolylsulfonyl sucrose and tetra-O-p-tolylsulfonyl-sucrose. It will be understood that the descriptive matter of the following examples is not intended to limit the scope of our invention to the specific data therein set forth.

EXAMPLE 1

Synthesis of Tri-O-p-Tolylsulfonyl Sucrose

A solution of 80 g. of sucrose (.23 mol) in 1250 ml. of pyridine obtained by boiling is cooled to −40°, whereupon 136 g. (.71 mol) of tolylsulfonyl chloride is added with vigorous stirring. Stirring is continued until all the tolylsulfonyl chloride is dissolved. After 3 hours at −40° and 17 hours at −17°, a crystalline precipitate appears (approximately 5–10 g.). Saturated aqueous sodium bicarbonate (30 ml.) is added and the mixture held at 25° for 30 minutes, after which it is poured into 8 l. of dilute aqueous sodium bicarbonate. The aqueous phase is decanted and the oily precipitate triturated with repeatedly renewed water. The residue is then dissolved in dichloromethane, shaken with 1 N-sulfuric acid, water, and aqueous sodium bicarbonate, dried with sodium sulfate, and evaporated in vacuum to give a brittle foam which is pulverized and further dried in a desiccator. Yield 118 g. (63%). Analysis.—Calculated for $C_{33}H_{40}O_{17}S_3$ S, 11.95. Found: S, 11.97 (average).

EXAMPLE 2

Synthesis of Tetra-O-p-Tolylsulfonyl-Sucrose

A solution of 500 g. of sucrose and 20 g. of disodium phosphate in 600 ml. of water is diluted with 300 ml. of 1,2-dimethoxyethane and stirred vigorously while 1 kg. of tolylsulfonyl chloride, technical grade, (=4.48 moles per mole of sucrose) is added batchwise. Aqueous sodium hydroxide (50% w.v.) is admitted at a rate such as to keep the pH between 8 and 10. The temperature is held between 15 and 25° by keeping the reaction vessel in a cold water bath. The addition of sodium hydroxide is discontinued after 7½ hours, as the pH then remains constant. A total of 447 ml. of sodium hydroxide solution, containing 223.5 g. of anhydrous sodium hydroxide is added. Stirring is stopped after 9½ hours. Ten liters of water are added, the gum triturated with repeatedly renewed water (decantation), then dissolved in dichloromethane. The solution is dried with sodium sulfate, whereupon the solids are removed by centrifugation. The solution is evaporated in batches in such a manner that a foam is formed, which is pulverized and further dried in vacuum. Yield 878 g. (78%). Analysis.—Calculated for $C_{40}H_{46}O_{19}S_4$: C, 50.09; H, 4.83; S, 13.39. Found: C, 50.33; H, 4.79; S, 13.34.

Other solvents such as N,N-dimethylformamide or dimethylsulfoxide may be substituted for the 1,2-dimethoxyethane.

Tetra-O-p-tolylsulfonyl-sucrose is miscible with suitable plasticizers in desired proportions so as to obtain oil resistant coatings or laminated compositions and adhesives for metals, wood, plastics, and glass. The following example illustrates this aspect of the invention.

EXAMPLE 3

Plasticization of Tetra-O-p-Tolylsulfonyl Sucrose With Sucrose Acetate Isobutyrate Tetra-O-p-tolylsulfonyl-sucrose and sucrose acetate isobutyrate (SAIB, Eastman Chemical Products, Inc., Kingsport, Tenn.) in a proportion of about 5:2, are dissolved in a small amount of dichloromethane (or other suitable solvent); the required consistency is then obtained by evaporating the appropriate amount of solvent. The ensuing mixture forms a clear, colorless film upon casting on a glass plate and provides a strong, transparent and colorless bonding material for two glass plates.

Another plasticizer, such as tri-ethyl citrate, dioctyl phthalate, furfuryl alcohol, citral, or tricresyl phosphate, may be used to replace part or all of the sucrose acetate isobutyrate of the foregoing example.

As previously stated, tri-O-p-tolylsulfonyl-sucrose and tetra-O-p-tolylsulfonyl-sucrose form polymers by condensation with bifunctional organic compounds such as aromatic dithiols, alkylene diamines, aromatic diamines and aromatic diisocyanates. The formation of these condensation polymers is facilitated by the presence of non-substituted hydroxyl groups on the sucrose molecule, in which either three or four p-tolylsulfonyl groups are present. The reactive hydroxyl groups are located on carbon atoms which form the two heterocyclic rings of the sucrose molecule; this influences the condensation polymerization characteristics of the p-tolylsulfonyl-substituted sucrose monomers. Typical examples of such polymers are now given by way of illustration; it being understood that the proportions of comonomers can be varied within wide ranges: e.g., in the proportion of 1 mol tolylsulfonyl-sucrose to about .8–3 mols of other co-monomer, and in the case of diisocyanates, about 0.8–5 mols of diisocyanate.

EXAMPLE 4

*Polymer of Tri-O-p-Tolylsulfonyl Sucrose and an Aromatic Dithiol*

A mixture of 63 g. of tri-O-tolylsulfonyl-sucrose, 43 ml. of N,N-dimethylformamide, 43 ml. of acetonitrile, 13.8 ml. of benzene-1,3-dithiol, and 20 g. of anhydrous potassium carbonate is refluxed for 5 hours (bath temperature 105–110°). After cooling the mass is triturated with repeatedly renewed large amounts of water, whereupon the product becomes brittle. It is then filtered off, pulverized, and dried in air. The yellow powder has thermo-plastic properties, and becomes a resilient, plastic gum when warmed to 100°. It is soluble in dioxane, N,N-dimethylformamide, dimethylsulfoxide, phenol, pyridine (gel formation with several of these solvents); partially soluble in acetone, butanone, 1,2-dimethoxyethane, hot butanol; insoluble in dichloromethane, acetonitrile, methylal, benzene, glycerol, cold butanol. It can be plasticized with commercial plasticizers such as sucrose acetate isobutyrate and/or triethyl citrate.

EXAMPLE 5

*Polymer of Tetra-O-p-Tolylsulfonyl-Sucrose and an Aromatic Dithiol*

A mixture of 1.1 g. of tetra-O-p-tolylsulfonyl-sucrose, 320 mg. of benzene-1,3-dithiol, 550 mg. of anhydrous potassium carbonate, 4 ml. of N,N-dimethylformamide, and 3 ml. of xylene is heated under a 25 mm. vacuum in an 80° bath for 4 hours; the xylene, and some of the dimethylformamide, are distilled off, simultaneously removing any moisture present. A higher vacuum is then applied to distill off the bulk of the remaining solvent. The gummy residue is mixed with 10 ml. of water and triturated. The material becomes powdery and is further washed with water, and then dried in air. The light brown product is insoluble in water, aliphatic alcohols, ether, dichloromethane, aromatic and aliphatic hydrocarbons. With acetone and butanone the material swells up to become a gel; this can be reversed by drying or by the addition of water. The polymer is completely soluble in hot phenol. Plasticizers, e.g., those of Example 4, may be added.

The polymers of Examples 4 and 5 are suitable in the solid state for extrusions and moldings, and in the plasticized and/or dissolved state as adhesives and coatings.

The following examples illustrate the formation of condensation polymers of tri-O-p-tolylsulfonyl-sucrose and tetra-O-p-tolylsulfonyl-sucrose with alkylene diamines (e.g., those having from 2 to 6 carbon atoms in the molecule) and aromatic diamines, e.g., tolylene diamine (diaminotoluene).

EXAMPLE 6

*Polymer of Tetra-O-p-Tolylsulfonyl-Sucrose With Ethylene Diamine*

A solution of 24.9 g. of tetra-O-p-tolylsulfonyl-sucrose in 25 ml. of acetonitrile is mixed with 2.2 ml. of dry ethylene diamine and 4.3 g. of anhydrous potassium carbonate and refluxed for 9 hours (bath 110°). After cooling, the whole mass is poured into 500 ml. of water and the sirup triturated. The supernatant liquid is decanted and replaced with clean water; this is repeated three times, with occasional trituration. The sirup becomes brittle overnight; the material is pulverized and dried. Yield: 12.8 g. (79.5%).

The yellow powder is insoluble in water, benzene, toluene; partly soluble in anisole; soluble in methanol; ethanol, acetone, dioxane, dichloromethane. The powder fuses to a viscous mass upon heating.

EXAMPLE 7

*Polymer of Tetra-O-p-Tolylsulfonyl-Sucrose and Hexamethylenediamine*

A mixture of 40 g. of tetra-O-p-tolylsulfonyl-sucrose, 7 g. of hexamethylenediamine, practical grade (97%) and 10 ml. of dimethyl-sulfoxide is slowly heated in the course of 30 minutes to 150°, when a spontaneous exothermic reaction take place and the material darkens considerably. The mixture is held for 2 hours at 100° and for 20 hours at 80°. After cooling to room temperature, the trituration with large amounts of water affords a dark brown resilient plastic material. Complete drying leaves a very brittle product. By adding a suitable plasticizer, e.g., 5–20 by weight of dioctyl phthalate, furfuryl alcohol, triethyl citrate, citral, or tricresyl phosphate, the plastic and elastic properties of the polymer are further enhanced.

EXAMPLE 8

*Polymer of Tri-O-p-Tolylsulfonyl Sucrose and 2,4-Diaminotoluene*

A solution of 1.6 g. of tri-O-p-tolylsulfonyl sucrose and 267 mg. (1.1 molar equivalents) of 2,4-diaminotoluene in 3 ml. of dimethyl-formamide is held for 16 hours at 100° and for 3 hours of 130°. The reaction mixture is cooled and diluted with aqueous ammonia, which causes the precipitation of a brown amorphous solid. The precipitate is washed with water and hot toluene, and further purified by treating its solution in butanone with charcoal. As mere evaporation in vacuum gives only a sticky, viscous material, a large amount of petrol ether is added to the solution whereupon the product separates as a flocculent precipitate, which, after drying, consists of a light brown powder. Yield 1.0 g. Plasticization may be effected with the same plasticizers as in Example 7.

The polymers of Examples 6 to 8 are also soluble in other organic solvents such as dimethylformamide, hexamethyl phosphoramide, anisole, etc. The unplasticized polymers are suitable for resilient moldings, forms, useful for pillow filling and other analogous uses. In the plasticized and/or dissolved state, they are useful as putty, adhesives, laminated compositions and the like.

The following examples illustrate the formation of a cross-linked polymer of tolylsulfonyl-substituted sucrose and aromatic diisocyanate.

EXAMPLE 9

*Polymer of Tetra-O-p-Tolylsulfonyl-Sucrose and Tolylene Diisocyanate*

A mixture of 4.8 g. of tetra-O-p-tolylsulfonyl-sucrose, 0.9 ml. of tolylene diisocyanate (Mondur, TD, Mobay Chemical Company, New Martinsville, West Virginia), and 2 ml. of dichloromethane is warmed until a homogeneous solution is obtained; then, 8 drops of triethylamine are added and the ensuing mixture gradually (in the course of 8 minutes) warmed to 140° C., at which temperature it is held for 20 minutes. After cooling, the product consists of a brittle, virtually colorless lightweight foam. The polymer thus obtained does not decompose when heated at 200° C. and is resistant toward dissolution in water and most inorganic and organic solvents, such as hot or cold water, hydrochloric acid, ethyl acetate, ethanol, butanol, phenol, dimethyl formamide.

Foaming may be obtained by using a low boiling solvent, such as dichloromethane, or by the addition of an excess of diisocyanate and appropriate amounts of water, in accordance with well-established procedures for the production of polyurethanes.

Other diisocyanates, such as alkylene diisocyanates having from six to nine carbon atoms in the alkylene radical, e.g., hexylene diisocyanate and nonylene diisocyanate; dodecyl tolylene diisocyanate; and other alkylarylene diisocyanates may be substituted for the tolylene diisocyanate of this example. These polymers are of the polyurethane type (condensation products of a diisocyanate and a polyhydroxylated compound), and are suitable for many uses to which polyurethanes are usually put, such as solid structural polymers or cellular filling material, and in the solvated state (e.g., by the use of dimethylsulfoxide) may be applied as coatings.

Having thus described the principle of our invention and several illustrative examples of carrying the same into practice, we wish it understood that departures and variations will readily occur to the expert. For instance, plasticizers and/or solvents enumerated in one example may be used with polymers set forth in another example. These and similar variations are intended to be encompassed within the scope of our invention which we now proceed to define by the appended claims.

We claim:

1. Process for the production of a polymer, comprising reacting above room temperature a member of the group consisting of tri-O-p-tolylsulfonyl-sucrose and tetra-O-p-tolylsulfonyl-sucrose with a difunctional organic compound copolymerizable therewith and being a member of the group consisting of benzene dithiol, an alkylene diamine having from two to six carbon atoms in the molecule, tolylene diamine, a tolylene diisocyanate, and an alkylene diisocyanate having from six to nine carbon atoms in its alkylene radical, for a time sufficient to form a solid polymer.

2. The process of claim 1, wherein said difunctional organic compound is benzene dithiol.

3. The process of claim 1, wherein said alkylene diamine is ethylene diamine.

4. The process of claim 1, wherein said alkylene diamine is hexamethylene diamine.

5. The process of claim 1, wherein said difunctional organic compound is tolylene diamine.

6. The process of claim 1, wherein said difunctional organic compound is tolylene diisocyanate.

7. Process for the production of a polymer, comprising reacting tetra-O-p-tolylsulfonyl-sucrose with tolylene diisocyanate above room temperature and for a time sufficient to form a solid polymer.

8. A polymer produced by the process of claim 1.
9. A polymer produced by the process of claim 2.
10. A polymer produced by the process of claim 3.
11. A polymer produced by the process of claim 4.
12. A polymer produced by the process of claim 5.
13. A polymer produced by the process of claim 6.
14. An adhesive composition essentially consisting of a plasticized polymer according to claim 8.
15. An adhesive composition according to claim 14, wherein said polymer is plasticized with a plasticizer being a member of the group consisting of dioctyl phthalate, furfuryl alcohol, triethyl citrate, citral, tricresyl phosphate, and sucrose acetate isobutyrate.

References Cited in the file of this patent

UNITED STATES PATENTS

| | | |
|---|---|---|
| 1,796,980 | Calcott | Mar. 17, 1931 |
| 1,862,270 | Kallner | June 7, 1932 |
| 1,938,966 | Jaejar | Dec. 12, 1933 |
| 2,076,795 | Seymour | Apr. 13, 1937 |
| 2,092,677 | Lovett | Sept. 7, 1937 |
| 2,126,936 | Wall | Aug. 16, 1938 |
| 2,314,972 | Dreyfus | Mar. 30, 1943 |
| 2,365,776 | Raymond et al. | Dec. 26, 1944 |
| 2,392,105 | Sussman | Jan. 1, 1946 |
| 2,926,177 | Linn | Feb. 23, 1960 |